United States Patent [19]
Waters

[11] 3,948,846

[45] Apr. 6, 1976

[54] POLYMERIC DISPERSION

[75] Inventor: Julian Alfred Waters, Reading, England

[73] Assignee: Imperial Chemical Industries Limited, London, England

[22] Filed: Oct. 27, 1972

[21] Appl. No.: 301,332

[30] Foreign Application Priority Data

Nov. 1, 1971 United Kingdom............... 50639/71
Aug. 8, 1972 United Kingdom............... 36937/72

[52] U.S. Cl.... 260/33.6 UA; 260/33.6 A; 260/34.2; 260/880 B
[51] Int. Cl.². ..................... C08K 5/01; C08L 9/06
[58] Field of Search....... 260/34.2, 880 B, 879, 886, 260/885, 33.6 A, 33.6 UA

[56] References Cited
UNITED STATES PATENTS

| | | | |
|---|---|---|---|
| 3,264,234 | 8/1966 | Osmond............................ | 260/34.2 |
| 3,441,530 | 4/1969 | Bauer................................ | 260/880 |
| 3,567,798 | 3/1971 | Haefele et al............... | 260/33.6 UA |
| 3,621,077 | 11/1971 | Donat............................... | 260/880 |
| 3,725,505 | 4/1973 | O'Malley........................... | 260/880 |
| 3,726,824 | 4/1973 | Saunders.......................... | 260/880 |
| 3,734,978 | 5/1973 | Schwab............................. | 260/886 |
| 3,770,712 | 11/1973 | Schwab............................. | 260/93.5 R |

*Primary Examiner*—Joseph L. Schofer
*Assistant Examiner*—Maria S. Tungol
*Attorney, Agent, or Firm*—Cushman, Darby & Cushman

[57] ABSTRACT

A dispersion is described of block copolymer particles in a saturated aliphatic hydrocarbon diluent, the block copolymer consisting of a thermoplastic tertiary butyl styrene polymer block A of molecular weight 10,000–100,000 which is soluble in the diluent, an elastomeric conjugated diene polymer block B of molecular weight 1,000–100,000 which is terminally attached to block A, and a styrene homopolymer or copolymer block C of molecular weight 20,000–1,000,000 which is terminally attached to block B, is insoluble in the diluent and forms at least part of the core of the particles. The particles may be separated from the diluent while retaining their previous molecular organization, i.e. with the insoluble block C present in the core of the particles and the thermoplastic block A remote from the core, and may be converted by hot pressing into shaped articles having impact resistance. A process is also described for producing such a particle dispersion by anionic polymerization of monomers in the hydrocarbon diluent to form successively the polymer blocks A, B and C.

18 Claims, No Drawings

POLYMERIC DISPERSION

This invention relates to a dispersion of particles of a polymeric material, to particles of the polymeric material, and to articles fabricated from said particles.

It has been proposed to prepare dispersions of a polymeric material in a diluent the material comprising a thermoplastic component insoluble in the diluent and forming the core of the particles and an elastomeric component soluble in or solvated by the diluent and which stabilises the particles against flocculation. The dispersions may be prepared, for example, by graft polymerising a monomeric material onto the macromolecular chains of an elastomeric polymeric material soluble in the diluent, the monomeric material polymerising to form the insoluble polymeric component.

The particles of the polymeric material may be isolated from the aforementioned dispersions. Articles fabricated from these particles suffer from the disadvantage that they may be of low strength although this disadvantage may be overcome if the elastomeric component in the polymeric material is cross-linked during fabrication. However, where the elastomeric component is cross-linked the polymeric material is no longer reprocessible.

We now provide a dispersion of particles of a polymeric material, the particles of which may be fabricated into shaped articles and with which the aforementioned disadvantage is substantially overcome it being unnecessary to chemically link together the particles in order to overcome the said disadvantage. Furthermore, the polymeric material is reprocessible.

According to the present invention there is provided a dispersion of particles of a block copolymeric material in a diluent said material comprising at least a polymer block insoluble in said diluent and which forms at least part of the core of said particles and a terminal thermoplastic polymer block solvated by said diluent and which provides stabilisation for said particles.

The thermoplastic polymer block, when in the form of a homopolymer of the same molecular weight as that of the thermoplastic polymer block in the block copolymeric material, should have a glass-rubber transition temperature (Tg) of at least 25° C, and preferably at least 80° C. Preferably, the thermoplastic polymer block has a softening point of less than 200° C.

The thermoplastic polymer block in the block copolymeric material is solvated by the diluent, by which we mean that the diluent is a good solvent for the aforementioned block. Conversely, where the diluent is a poor solvent for the polymer block the polymer block is referred to as being insoluble in the diluent. The thermoplastic polymer block in the block copolymeric material will hereinafter be referred to as being soluble in the diluent.

The polymer block in the block copolymeric material which forms at least part of the core of the particles may be an elastomeric polymer or a thermoplastic polymer or a mixture thereof or it may be a cross-linked polymer derived from an elastomeric or thermoplastic polymer or a mixture thereof.

By an elastomeric polymer we mean a polymer having a glass-rubber transition temperature of less than 25° C.

The aforementioned blocks in the block copolymeric material which are respectively soluble in and insoluble in the diluent may be directly attached to each other by a covalent bond or, if desired, they may be attached to each other through at least one other block of a polymeric material. The latter polymeric block may be soluble in or may be insoluble in the diluent and it may be elastomeric or thermoplastic.

In general, however, the particles in the dispersion of our invention comprise a thermoplastic polymer block soluble in the diluent (hereinafter referred to as block A), attached to block A a polymer block which may be thermoplastic or elastomeric, and which is generally elastomeric, and which may be insoluble in or soluble in the diluent (hereinafter referred to as block B), and attached to block B a polymer block insoluble in the diluent and forming at least part of the core of said particles (hereinafter referred to as block C), the block A, and block B, if soluble in the diluent, forming a solvated sheath around the particles thus, we believe, providing stabilisation for the particles against flocculation and aggregation.

In the block copolymeric material the thermoplastic polymer block which is soluble in the diluent is a terminal block in the macromolecular chain of the material, by which we mean that the aforementioned thermoplastic polymer block should be at an end of the macromolecular chain of the material. Thus, in an ABC block copolymer of the type particularly described the soluble thermoplastic polymer block A is at one end of the macromolecular chain.

Although the block copolymer material in the dispersions of our invention may comprise two or more polymer blocks the invention will be described hereinafter with particular reference to an ABC block copolymer of the type described.

The particles may be separated from the diluent and then converted into a shaped article, for example, by pressing in a mould. It will be noted that the particles always have a terminal block A remote from the core and which is a thermoplastic polymeric material. Provided that the moulding is effected at a temperature at which this polymer block A is softened, the particles may be fused together on moulding. Furthermore, the articles fabricated from the particles of our invention may be reprocessed or reshaped. Where the particles contain an elastomeric polymer block they may be fabricated into a shaped article having impact resistance. Moreover, where the elastomeric block is a major component of the block copolymeric material the shaped article may be elastomeric and it is preferred that in this case the block copolymeric material comprises at least 30% by weight, and more preferably at least 50% by weight of at least one elastomeric block by weight of the block copolymeric material.

The block copolymers forming the particles in the dispersions of our invention may be prepared by anionic polymerisation of the monomers forming the polymer blocks and in a further embodiment of our invention we provide a process for the preparation of a dispersion of particles of a block copolymeric material in an inert diluent the process comprising charging a monomer to a solution of an anionic initiator in an inert diluent and polymerising said monomer to form a thermoplastic polymer block which is soluble in said diluent and which is itself capable of initiating polymerisation, and thereafter contacting said thermoplastic polymer block successively with further monomer or monomers and successively polymerising said monomer or monomers to form a block copolymer, at least one of the further monomer or monomers forming a polymer block which is insoluble in said diluent and which is present in a concentration such that a dispersion of particles of block copolymeric material is formed.

By inert diluent we means a diluent which is liquid under the polymerisation conditions and which has little or no deleterious effect on the catalytic activity of the initiator. Suitably the diluent is an organic diluent.

The anionic initiator may be, for example, a metal hydrocarbyl, especially a metal alkyl, known in the art as an anionic initiator. Suitable examples include alkyl lithiums and alkyl sodiums, e.g. n-butyl lithium, tertiary-butyl lithium, amyl lithium and phenyl lithium, and the corresponding hydrocarbyl sodium compounds.

A preferred anionic initiator is sec-butyl lithium on account of the narrow molecular weight distribution in the block copolymeric materials prepared with this catalyst.

Suitable diluents include hydrocarbon diluents, for example, propane, butane, pentane, hexane, heptane, octane, nonane, decane, cyclohexane, benzene, toluene and higher molecular weight hydrocarbons. Mixtures of diluents may be used if desired.

Polymerisation should be effected in a diluent which is substantially free of water and also in the substantial absence of oxygen, for example, under an atmosphere of an inert gas, e.g. nitrogen. The diluent should be sufficiently free of oxygen and water such that the catalytic activity of the initiator is substantially unaffected.

Those skilled in the art of anionic polymerisation will readily appreciate that anionic polymerisation of a monomeric material in a diluent may produce a polymer block in the diluent which has an anionic end group capable of initiating polymerisation of certain further monomeric materials charged to the diluent. However, a polymer block having such an end group may not be capable of initiating the polymerisation of all other monomeric materials. The monomeric material charged to the diluent must be capable of being polymerised by the anionic and group on the polymer which is present in the diluent. The man skilled in the art will readily be able to select suitable combinations of monomers from which the block copolymers may be produced.

The monomeric materials from which the block copolymeric material is produced are preferably soluble in the diluent under the conditions of polymerisation and are usually ethylenically unsaturated.

In the dispersion of block copolymeric material of the present invention the block copolymeric material is preferably a block copolymer formed by a process which comprises charging a monomer to a solution of an anionic initiator in an inert diluent and polymerising said monomer to form a thermoplastic polymer block (block A) which is soluble in said diluent and which is itself capable of initiating polymerisation, thereafter contacting said polymer block with a further monomer and polymerising said further monomer to form a polymer block which may be elastomeric or thermoplastic (block B), and which is itself capable of initiating polymerisation, and thereafter contacting said elastomeric or thermoplastic polymer block with another monomer and polymerising said other monomer to form a polymer block (block C) insoluble in the diluent and which forms at least part of the core of the particles.

The polymer blocks may be formed from a single monomer or a mixture of monomers. Thus, for example, block A may be formed from a single monomer or two or more monomers. Thus, Block A may itself be a copolymer, e.g. a random copolymer.

The polymer block (block A) must be thermoplastic and soluble in the diluent and the nature of the monomer from which the polymer block is produced, the nature of the diluent, the nature of the initiator, and the temperature at which the polymerisation is effected must be chosen to achieve this end.

For example, we have found that styrene may be polymerised with n-butyl lithium or sec-butyl lithium as initiator in a diluent of cyclohexane at a temperature in the range 30° to 80°C to produce a thermoplastic polymer block (block A) soluble in the diluent. In this case the end group on the polystyrene block may be used to initiate polymerisation of a monomer capable of forming an elastomeric polymer block (block B), for example, butadiene or an alkyl butadiene, e.g. isoprene or n-butylstyrene, and the end group on the elastomeric block thereby produced may initiate polymerisation of a monomer which gives a polymer block (block C) insoluble in the diluent and which forms the core of the particles in dispersion. The latter monomer may be, for example, methyl methacrylate, dimethylaminoethyl methacrylate, or methacrylonitrile.

Alternatively, where the diluent is an aromatic hydrocarbon, e.g. benzene or toluene, polymer block A may be polystyrene, polymer block B may be formed from any of the monomers hereinbefore described as suitable for forming polymer block B, or it may be formed by polymerising methyl methacrylate or dimethylaminoethyl methacrylate where an elastomeric block is not desired, and polymer block C may be formed from acrylonitrile or methacrylonitrile.

Other suitable combinations of monomers from which the polymer blocks may be produced include, for example, polymer block A prepared by polymerisation of tertiary butyl styrene, polymer block B prepared by polymerisation of butadiene, isoprene or n-butyl styrene and polymer block C, which is insoluble in the diluent, prepared by polymerisation of styrene, vinyl pyridine, divinyl benzene, a styrene-divinylbenzene mixture, methylmethacrylate, ethylacrylate, dimethylaminoethyl methacrylate or methacrylonitrile. In this case a suitable diluent in which to effect the polymerisation is heptane.

Accurate control over the molecular weight of the polymer blocks in the block copolymer may be achieved merely by appropriate choice of the amount of the anionic initiator used and the amounts of the monomers used to form the respective polymer blocks in the block copolymer.

Using the above described process particles in which the block copolymeric material has a narrow molecular weight distribution may be obtained.

The molecular weight of the polymer block A may suitably be in the range 10,000 to 100,000 although it may have a molecular weight outside this range, if desired. The temperature at which an article fabricated from the particles of block copolymer may be used is governed by the Tg of the block A as at a temperature above the Tg the article may become weak. The Tg of the polymer block A should be at least as high as, and preferably at least 50°C higher than, the maximum temperature at which the article is to be used.

The molecular weight of the polymer block B may suitably be in the range 1,000 to 100,000 and, where it is an elastomeric block, it preferably has a molecular weight in excess of 10,000 in order that in an article fabricated from the particles of block copolymer the elastomeric block makes a significant contribution towards improving the impact strength of the article, or imparts elastomeric properties to the article if this is desired.

Preferably the molecular weight of block A, or the molecular weight of the A and B polymer blocks together if both blocks are soluble in the diluent, does not exceed 250,000 otherwise the polymer block C may have to be of very high molecular weight in order that a block C insoluble in the diluent and capable of producing an insoluble particle phase may be formed.

The molecular weight of polymer block C is preferably in excess of 10,000 and suitably is in the range 20,000 to 1,000,000.

In the block copolymeric material the polymer block which is insoluble in the diluent may, if desired, be a cross-linked polymer and may be formed by polymerisation of a monomer containing a plurality of polymerisable groups or by polymerisation of a mixture of monomers containing at least one monomer having a plurality of polymerisable groups.

A suitable monomer containing a plurality of polymerisable groups is divinyl benzene.

We have found that where the polymer block which is insoluble in the diluent and which forms at least part of the core of the particles is a cross-linked polymer there may be resultant advantages when the particles are fabricated into an article.

Thus, where the block copolymer is an ABC block copolymer with block B elastomeric and an elastomeric article is desired fabrication of the particles should result, we belive, in a continuous phase in the shaped article which includes the elastomeric block B in the continuous phase, the block C being, or forming part of, the discontinuous phase.

However, we have found that fabrication of the particles may result in phase inversion, that is, the article may comprise a continuous phase of the block C with the elastomeric block B being in a discontinuous phase.

Thus, where phase inversion has taken place the elastomeric block may, in certain circumstances, not form part of the continuous phase with the result that the article may not possess the desired elastomeric properties.

However, where the insoluble block C is a cross-linked polymer this tendency to phase inversion may be decreased.

This cross-linking may be achieved in other ways.

For example, it can be arranged that the polymer block or blocks forming the core of the particles contain a polymerisable ethylenically unsaturated group or groups through which cross-linking may subsequently be effected, e.g. by reaction with $S_2Cl_2$ or by copolymerisation together with at least one other ethylenically unsaturated monomer to form a cross-linked polymer in the core of the particles.

Where a stable dispersion is desired the polymerisation of monomer forming polymer block C should be carried out to such an extent that a dispersion of block copolymer is formed but should not be carried out to such an extent that the molecular weight of the polymer block C is so high that flocculation or aggregation of the particles occurs.

However, using the process described above we have found that there may be a limit to the molecular weight of the insoluble block beyond which particle flocculation and aggregation occurs. This may impose a limit on the size of the particles that may be obtained by the process. This limit typically occurs when a particle size of approximately 0.1 micron diameter is reached although it depends on the molecular weight of the soluble block or blocks, the nature of the insoluble block or blocks, the nature of the diluent phase and the temperature. With higher molecular weights for the soluble block or blocks, higher molecular weights for the insoluble block or blocks may be tolerated before this limit is reached. For example, with a poly(tertiary butyl styrene)-polystyrene block copolymer where poly(tertiary-butyl styrene) is the soluble polymer block and polystyrene is the insoluble block, we have found that where the block copolymer is prepared in heptane at 25°C and the soluble block molecular weight is 10,000 the limit of stability is reached when the insoluble block molecular weight is about 60,000. In this case the particle diameter, measured by electron microscopy, is approximately 0.08 micron. When the insoluble block molecular weight is increased further by further addition of styrene, flocculation occurs. The degree of flocculation increases with further increase in molecular weight of the insoluble block. This is apparent from an abnormal increase in the viscosity of the dispersion and the formation of a sediment at the bottom of the reactor when agitation of the dispersion is stopped.

However, we have also found that by modifying the process of our invention by which block copolymer dispersions are produced, we are able to produce dispersions having particle sizes in excess, and often considerably in excess of the aforementioned limit of 0.1 micron.

Thus, the process of our invention in which a dispersion of particles of a block copolymer is produced may be modified in such a way that during polymerisation of the monomer which forms the polymer block insoluble in the diluent there is present in the diluent a polymer (hereinafter referred to as the added polymer) which added polymer is itself capable of initiating polymerisation of the monomer forming the insoluble polymer block in the dispersion and which includes at least a terminal thermoplastic polymer block soluble in said diluent. The added polymer may be a block copolymer comprising a terminal thermoplastic polymer block soluble in the diluent and a polymer block insoluble in the diluent and which is capable of initiating polymerisation.

The added polymer, which may be in the form of a dispersion, may be charged periodically or continuously to the diluent together with periodic or continuous additions of monomer which by polymerisation forms the insoluble block. The added polymer should be present in the diluent during formation of the insoluble polymer block and before the molecular weight of the insoluble block has reached the limit at which flocculation or aggregation of the dispersion occurs. Both the insoluble block and the added polymer increase in molecular weight as a result of further polymerisation. The added polymer, it is believed, functions as a stabiliser and maintains the block copolymer particles in stable dispersion even when the insoluble block molecular weight in the particles in the dispersion is increased in considerable excess over the limit at which flocculation or aggregation of the particles would normally occur.

In an alternative modification of the process of our invention during polymerisation of the monomer to form the polymer block insoluble in the diluent there may be present in the diluent a copolymer (hereinafter referred to as the added copolymer) which added copolymer comprises at least a thermoplastic polymer block soluble in said diluent and a polymer block which is insoluble in said diluent and which includes at least one polymerisable group.

The added copolymer, which may be in the form of a dispersion has one or more polymerisable groups within the insoluble block or blocks in the added copolymer. This group is capable of copolymerising with the monomer forming the insoluble block in the dispersion of particles. For example, in the preparation of a dispersion of particles of block copolymer in which the soluble block is poly(tertiary butyl styrene) and the insoluble block is polystyrene, the added copolymer may be a block copolymer where the soluble block is poly(tertiary butyl styrene) and the insoluble block comprises polystyrene with one or more copolymerised terminal divinyl benzene groups, said added polymer per se being unable to initiate polymerisation.

The process of our invention may be modified in yet a further way in that during formation of the dispersion of particles there may be present in the diluent a copolymer, which may be in the form of a dispersion of particles, which copolymer is incapable of initiating polymerisation and which comprises at least a thermoplastic polymer block soluble in the diluent and a polymer block insoluble in the diluent. In this case the copolymer may be present at the start of the polymerisation process or it may be added continuously or periodically throughout the polymerisation process. The copolymer may be in the form of a dispersion in which case the molecular weight of the insoluble block or blocks of the copolymer should be low enough that the dispersion of particles is stable. This alternative modification is illustrated by the preparation of particles of poly(tertiary butyl styrene)/polystyrene block copolymer in heptane at 25° C. Poly(tertiary butyl styrene)/polystyrene block copolymer may be used as the copolymer which is present in the diluent or is added to the diluent. For example, where the molecular weight of the soluble poly(tertiary butyl styrene) block of the copolymer is 10,000 the molecular weight of the insoluble polystyrene block should be less than 60,000, preferably less than 30,000 and preferably greater than 5,000.

Using the modified processes, particles may be obtained having diameters within a range from a few hundred Angstrom to many tens of microns.

Using the modified processes, dispersions containing particles of dissimilar sizes and fluid dispersions having very high solids content, even up to 80% by weight, may be produced.

The particles in the dispersion of our invention may be caused to flocculate, for example, by adding to the dispersion of a non-solvent for the polymer block which is soluble in the diluent, or by evaporation of the diluent. Thereafter the particles may be dried and fabricated into a shaped article, for example, by shaping and heating in a suitably shaped mould, e.g. by compression moulding. Alternatively, the dispersions may be used directly as film-forming compositions.

The particles may be fabricated into an article having any desired shape. Conveniently, however, the article may be in the form of a sheet which may thereafter, if desired, be further shaped, e.g. by vacuum forming or compression moulding.

The invention will now be illustrated by the following examples in which all parts are expressed as parts by weight.

All liquid diluents and monomers were stored over calcium hydride and further treated as follows:

Heptane was distilled under nitrogen from a dilute solution of butyl lithium and the distillate collected directly in the reactor.

Tertiary butyl styrene and styrene were distilled under reduced pressure in the presence of hydroquinone inhibitor, passed through a column of activated alumina, and stored under nitrogen.

Isoprene was distilled under nitrogen at atmospheric pressure.

Methylmethacrylate and acrylonitrile were distilled twice under reduced pressure. Divinyl benzene was extracted twice with a 10% weight/weight solution of sodium hydroxide in water, after each extraction the aqueous layer was rejected, and the divinyl benzene was then washed with water until the aqeuous washings were neutral. The divinyl benzene was then dried over calcium hydride and distilled under reduced pressure.

EXAMPLE 1

A glass reactor equipped with a stirrer, an inlet port through which monomers and initiators could be introduced and gas inlet ports, was washed with chloroform, rinsed with n-heptane, evacuated and finally purged with nitrogen until dry. Thereafter a positive pressure of nitorgen of approximately 2 cm of mercury over atmospheric was maintained.

The reactor was charged with 680 parts of n-heptane and 48 parts of tertiary-butyl styrene. A solution of sec-butyl lithium in n-hexane was then added slowly until a faint pink colouration appeared. A further quantity of solution containing 0.2 part sec-butyl lithium was added and polymerisation was allowed to proceed at 50° C.

After 1½ hours 48 parts of isoprene were added to the reactor and the temperature was maintained at 50° C for a further 4½ hours after which time the contents of the reactor were a colourless, clear mobile solution.

Thereafter 113½ parts of styrene were charged to the reactor, stirring was continued, and after 15 minutes a further 113½ parts of styrene and 0.3 part of tetrahydrofuran were added. The contents of the flask became opalescent and then a milk-like dispersion was formed. Stirring was continued for 15 hours after addition of the first quantity of styrene and the contents of the reactor were then allowed to stand in contact with air in order to terminate polymerisation.

The contents of the reactor were a fluid, milk-white dispersion. Electron microscopic examination of the dispersion indicated a particle size of approximately 0.1 micron diameter. After standing for 6 months a sample of the dispersion showed no visible signs of aggregation or sedimentation.

A small quantity of ethanol was added to a further sample of the dispersion. The particles in the dispersion rapidly settled, the supernatant liquid was decanted and the particles dried in a vacuum oven at room temperature.

Examination of the resultant powder by gel permeation chromatography indicated that the block copolymer had the following composition and molecular weight: poly(tertiary-butyl styrene) 15,000/polyisoprene 15,000/styrene 70,000.

The powder was compression moulded at 130° to 135° C under a pressure of 2500 lb./sq.in. for 5 minutes to give a sheet of dimensions 5 in. × 5 in. × ⅛ in.

EXAMPLE 2

The procedure of Example 1 was followed except that 2040 parts of n-heptane, 60 parts of tertiary-butyl styrene, 0.15 part of secondary-butyl lithium, 180 parts of isoprene, and in place of the total of 227 parts of styrene, a mixture of 114 parts of styrene and 6 parts of divinyl benzene as a 50% weight/weight solution of divinyl benzene in ethyl benzene was used, and the polymerisation of tertiary-butyl styrene and isoprene was effected for 2 hours and 5 hours respectively.

Electron microscopic examination of the resultant dispersion indicated a particle size of less than 0.1 micron diameter. After standing for 1 week the dispersion appeared to be stable against flocculation and aggregation.

The dispersion was then added to ethanol. Immediate flocculation occurred and the particles settled out. The particles were separated and then dried in a vacuum oven at room temperature. A small portion of the particles was then added to chloroform. The particles did not dissolve but produced a stable particulate dispersion in the chloroform. By way of contrast particles separated from a dispersion prepared as described above but omitting the divinyl benzene were soluble in chloroform indicating that the particles of the present example contained a polymer block of styrene and divinyl benzene which was cross-linked.

The particles comprised an ABC block copolymer where block A of poly(tertiary-butyl styrene) had an approximate molecular weight of 25,000, block B of polyisoprene had an approximate molecular weight of 75,000 and where block C was a cross-linked 95:5 styrene:divinyl benzene copolymer. The weight ratio of A:B:C was 16.7:50:33.3.

The particles of block copolymer were compression moulded at 130° to 135° C under a pressure of 2500 lb./sq.in. for 5 minutes to give an elastomeric sheet having dimensions of 5 in. × 5 in. × ⅛ in.

In a comparative example the procedure of Example 1 was repeated except that the reactor was charged with 2380 parts of n-heptane and 300 parts of iosprene and polymerisation of the isoprene was initiated by addition of 0.26 part of sec-butyl lithium as a solution in hexane. After 5 hours 100 parts of styrene were charged to the reactor and the styrene was allowed to polymerise to produce a dispersion.

After 5 hours the dispersion was added to excess ethanol to precipitate the particles and the particles were separated and dried in a vacuum oven at room temperature.

Examination of the resultant product by gel permeation chromatography indicated that the block copolymer had the following composition and approximate molecular weight:

polyisoprene 75,000/polystyrene 25,000.

The powder was compression moulded over a range of temperatures and pressures but the moulded product was always found to be sticky and of very low strength.

EXAMPLE 3

The procedure of Example 1 was followed except that 1970 parts of n-heptane, 41.2 parts of tertiary-butyl styrene, 0.13 part of sec-butyl lithium, 103 parts of isoprene, and 165 parts of styrene were used, the polymerisations of tertiary-butyl styrene and isoprene were effected for 2 hours and 5 hours respectively, and after polymerisation of the styrene had been carried out for 5 hours sufficient ethanol was added to the dispersion which had been formed to terminate the polymerisation.

The dispersion, which contained 13.5% by weight of solids, was precipitated by addition of the dispersion to an excess of ethanol and the particles were separated by filtration and dried in a vacuum oven at 250° C.

The particles were moulded for 5 minutes at 150° C under a pressure of 2,500 lb.sq.in$^{-1}$ to form a translucent ⅛ inch thick sheet having a notched impact strength of 23 kg cm$^{-2}$.

EXAMPLE 4

The procedure of Example 2 was followed except that 1970 parts of n-heptane, 160 parts of tertiary-butyl styrene, 1.03 part of sec-butyl lithium, and a mixture of 320 parts of styrene and 3.2 parts of divinyl benzene in the form of 50% weight/weight solution of divinyl benzene in ethyl benzene were used, and the isoprene was omitted.

In order to terminate polymerisation a small amount of ethanol was added to the resultant dispersion.

A sample of the resultant dispersion was placed in a small flask and mixed with 5 times its volume of chloroform which is a solvent for both poly(tertiary-butyl styrene) and polystyrene. The particles remained in dispersion indicating that the polymer block formed from styrene and divinyl benzene was insoluble and thus cross-linked.

When the above procedure was repeated except that the divinyl benzene was omitted the particles in the dispersion were completely soluble in chloroform.

EXAMPLE 5

In a first experiment, a dispersion of a block copolymer was prepared following the procedure of Example 1 by polymerisation of 40 parts of tertiary-butyl styrene and 20 parts of styrene in 680 parts of n-heptane containing 2.2 parts of tetrahydrofuran and using 1.28 parts of sec-butyl lithium. The isoprene used in Example 1 was omitted and polymerisation of the styrene was not terminated. The product, hereinafter referred to as the block copolymer stabiliser, was capable of initiating polymerisation.

In a second experiment, the procedure of Example 1 was followed to prepare a dispersion of block copolymer by polymerisation of 25 parts of tertiary-butyl styrene and 50 parts of styrene, the isoprene used in Example 1 being omitted, and polymerisation being initiated by 0.80 part of sec-butyl lithium.

After the styrene had been polymerised for 2 hours there was charged to the reactor a further 25 parts of styrene and a portion of the dispersion prepared in Experiment 1 containing 15 parts of the block copolymer stabiliser. Polymerisation was allowed to continue for a further 1 hour.

The above described additions of styrene and block copolymer stabiliser were repeated twice, the styrene being allowed to polymerise for 1 hour after each addition.

After the third addition the dispersion showed signs of flocculation after three days whereas when the above procedure of the second experiment was repeated in the absence of block copolymer stabiliser the dispersion began to flocculate after the first addition of a further 25 parts of styrene thus indicating that in the presence of the block copolymer stabiliser a higher molecular weight block of polystyrene, and thus a higher solids content dispersion, could be produced.

EXAMPLE 6

In a first experiment a dispersion of a block copolymer was prepared following the procedure of Example 1 by polymerisation of 50 parts of tertiary-butyl styrene and 100 parts of styrene in 1360 parts of n-heptane and using 0.64 part of sec-butyl lithium. The isoprene used in Example 1 was omitted, polymerisation of the styrene was allowed to proceed for 2 hours after which time 4.9 parts of divinyl benzene (in the form of a 50% weight/weight solution in ethyl benzene) was charged to the reactor and after a further 15 minutes sufficient air was admitted to the reactor to terminate polymerisation. The product will hereinafter be referred to as the block copolymer stabiliser.

In a second experiment the procedure of Example 1 was followed to polymerise 30 parts of tertiary-butyl styrene in 680 parts of n-heptane containing 0.25 part of tetrahydrofuran and using 0.48 part of sec-butyl lithium. The resultant solution of poly(tertiary-butyl styrene) in n-heptane was charged to a further reactor containing a portion of the dispersion prepared in Experiment 1 which contained 24 parts of the block copolymer stabiliser, 1750 parts of n-heptane and 120 parts of styrene. The styrene was allowed to polymerise at 50°C for 5 hours to produce a block copolymer dispersion.

EXAMPLE 7

In a first experiment a dispersion of a block copolymer was prepared following the procedure of Example 1 by polymerisation of 100 parts of tertiary-butyl styrene and 200 parts of styrene in 1360 parts of heptane and using 1.28 part of sec-butyl lithium. The isoprene used in Example 1 was omitted and after polymerisation of styrene had been allowed to proceed for 2 hours sufficient air was admitted to the reactor to terminate polymerisation. The product will hereinafter be referred to as the block copolymer stabliser.

In a second experiment the procedure of Example 1 was followed to polymerise 30 parts of tertiary-butyl styrene in 680 parts of n-heptane using 0.5 part of sec-butyl lithium. Polymerisation of the tertiary-butyl styrene was allowed to proceed for 2 hours to produce a solution of poly(tertiary-butyl styrene) in n-heptane.

The resultant solution of poly(tertiary (tertiary butyl styrene) in n-heptane was charged to a further reactor containing a portion of the dispersion prepared in Experiment 1 which contained 30 parts of the block copolymer stabliser, 1200 parts of n-heptane and 150 parts of styrene, and the styrene was allowed to polymerise at 50°C for 3 hours to produce a stable dispersion of poly(tertiary-butyl styrene)/polystyrene block copolymer.

EXAMPLE 8

The procedure of Example 7 was followed except that in the second experiment the styrene was replaced by 150 parts of methyl methacrylate and the methyl methacrylate was polymerised at 20°C instead of 50°C to produce a stable dispersion of a poly(tertiary-butyl styrene)/poly(methylmethacrylate) block copolymer.

EXAMPLE 9

The procedure of Example 1 was followed to polymerise 62 parts of tertiary-butyl styrene in 680 parts of n-heptane using 0.45 part of sec-butyl lithium. Polymerisation was allowed to proceed for 16 hours at 25°C.

Thereafter 159 parts of styrene were charged to the reactor and allowed to polymerise over a period of 3 hours. The product at this stage was stable white dispersion. Electron microscopic examination of a small sample of the dispersion showed the particle size was less than 0.1 micron.

Thereafter, 20 parts of acrylonitrile was charged slowly to the reactor over a period of 2 hours and polymerisation was terminated by admitting air to the reactor.

The product was a stable dispersion of a poly(tertiary-butyl styrene)/polystyrene/polyacrylonitrile block copolymer.

EXAMPLE 10

The procedure of Example 1 was followed to polymerise 180 parts of tertiary-butyl styrene in 2040 parts of n-heptane using 0.15 part of sec-butyl lithium. Polymerisation was allowed to proceed for 4 hours at 50°C.

Thereafter a mixture of 162 parts of styrene and 18 parts of isoprene was charged to the reactor continuously over a period of 1½ hours. Polymerisation was allowed to proceed for a further 3 hours and then air was admitted to the reactor to terminate polymerisation. The product was a stable dispersion of a poly(tertiary-butyl styrene)/poly(styrene-isoprene) block copolymer. The poly(styrene-isoprene) block was believed to be a random copolymer of styrene and isoprene.

The dispersion was concentrated by evaporating the n-heptane until the dispersion contained 30% by weight of solids. 0.5 part of disulphur dichloride was added to the dispersion with rapid stirring and after one hour the dispersion was evaporated to dryness. The resulting powder was insoluble in chloroform whereas powder prepared by following the above procedure except that reaction with disulphur dichloride was omitted was soluble in chloroform indicating that reaction with disulphur dichloride had resulted in the production of a block copolymer having a cross-linked polymer block.

What I claim is:

1. A dispersion of particles of a block copolymeric material in a saturated aliphatic hydrocarbon diluent which is substantially free of water, in which the block copolymeric material consists of a thermoplastic tertiary butyl styrene polymer A soluble in the diluent and having a molecular weight as determined by gel permeation chromatography of 10,000 to 100,000, terminally attached to block A an elastomeric polymer block B having a molecular weight of 1,000 to 100,000 and derived from a conjugated diene, and terminally attached to block B a polymer block C of molecular weight 20,000 to 1,000,000 which is insoluble in the diluent, forms at least part of the core of the said particles and is derived from styrene or from a monomer mixture of which a major constituent is styrene.

2. A dispersion as claimed in claim 1 in which the polymer block forming the core of the particles is a thermoplastic polymer.

3. A dispersion as claimed in claim 1 in which the block copolymeric material comprises at least 30% by weight of at least one elastomeric block by weight of the block copolymeric material.

4. A dispersion as claimed in claim 3 in which the elastomeric block is soluble in the diluent.

5. A dispersion as claimed in claim 1 in which the block copolymeric material comprises at least 50% by weight of at least one elastomeric block by weight of the block copolymeric material.

6. A dispersion as claimed in claim 1 in which in the block copolymeric material the polymer block insoluble in the diluent and forming the core of the particles is cross-linked.

7. A dispersion as claimed in claim 1 in which block A is a polymer of tertiary butyl styrene, block B is a polymer of a conjugated diene, and block C is a polymer of styrene.

8. A process for the preparation of a dispersion of particles of a block copolymeric material in a saturated aliphatic hydrocarbon diluent which is substantially free of water and oxygen, which consists in charging tertiary butyl styrene monomer to a solution of an anionic polymerization initiator in the said diluent and polymerizing the said monomer to form a thermoplastic block A of molecular weight as determined by gel permeation chromatography 10,000 to 100,000 which is soluble in the diluent and is itself capable of initiating polymerization, thereafter contacting the polymer block A with further monomer which is a conjugated diene and polymerizing said further monomer to form an elastomeric polymer block B of molecular weight 1,000 to 100,000 which is itself capable of initiating polymerization, and thereafter contacting the polymer block B with styrene or with a monomer mixture of which a major constituent is styrene and polymerizing said styrene or styrene-containing mixture to form a polymer block C of molecular weight 20,000 to 1,000,000 which is insoluble in the diluent and forms at least part of the core of the particles.

9. A process as claimed in claim 8 in which the insoluble block in the block copolymeric material is cross-linked and is formed by polymerisation of a monomer containing a plurality of polymerisable groups or by polymerisation of a mixture of monomers containing at least one monomer having a plurality of polymerisable groups.

10. A process as claimed in claim 8 in which the anionic initiator is n-butyl lithium or sec-butyl lithium.

11. A process as claimed in claim 8 in which, during polymerisation of the monomer which forms the polymer block insoluble in the diluent, there is present in the diluent an added polymer which added polymer is itself capable of initiating polymerisation of the monomer forming the insoluble polymer block in the dispersion and which includes at least a terminal thermoplastic block soluble in said diluent.

12. A process as claimed in claim 11 in which the added polymer is a block copolymer comprising a terminal thermoplastic polymer block soluble in the diluent and a polymer block insoluble in the diluent and which is capable of initiating polymerisation.

13. A process as claimed in claim 8 in which during polymerisation of the monomer which forms the polymer block insoluble in the diluent there is present in the diluent an added copolymer which added copolymer comprises at least a thermoplastic polymer block soluble in said diluent and a polymer block which is insoluble in said diluent and which includes at least one polymerisable group.

14. A process as claimed in claim 8 in which during formation of the dispersion of particles of block copolymeric material there is present in the diluent a copolymer incapable of initiating polymerisation and which comprises at least a thermoplastic polymer block soluble in the diluent and a polymer block insoluble in the diluent.

15. A process as claimed in claim 8 in which the monomer from which block A is formed is tertiary butyl styrene, the monomer from which block B is formed is a conjugated diene, and the monomer from which block C is formed is styrene.

16. A dispersion of particles of a block copolymer prepared by a process as claimed in claim 8.

17. A block copolymeric material in particulate form produced by separation of the block copolymeric material from the diluent in a dispersion as claimed in claim 1.

18. A shaped article prepared by fabrication of the particles of a block copolymeric material as claimed in claim 17.

* * * * *